(12) United States Patent
Hall

(10) Patent No.: US 11,507,161 B2
(45) Date of Patent: Nov. 22, 2022

(54) POWER AND SERIAL COMMUNICATION SCHEME

(71) Applicant: Simmonds Precision Products, Inc., Vergennes, VT (US)

(72) Inventor: Robbie W. Hall, Charlotte, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 290 days.

(21) Appl. No.: 16/738,884

(22) Filed: Jan. 9, 2020

(65) Prior Publication Data
US 2021/0216125 A1   Jul. 15, 2021

(51) Int. Cl.
| | | |
|---|---|---|
| *G06F 1/26* | (2006.01) | |
| *B64D 41/00* | (2006.01) | |
| *H02J 4/00* | (2006.01) | |
| *H04L 12/10* | (2006.01) | |

(52) U.S. Cl.
CPC ............ *G06F 1/266* (2013.01); *B64D 41/00* (2013.01); *H02J 4/00* (2013.01); *B64D 2221/00* (2013.01); *H04L 12/10* (2013.01)

(58) Field of Classification Search
CPC ..... B64D 2221/00; B64D 41/00; G06F 1/266; H02J 4/00; H04L 12/10
See application file for complete search history.

(56) References Cited

U.S. PATENT DOCUMENTS

| | | |
|---|---|---|
| 5,986,539 A | 11/1999 | Johansson et al. |
| 6,108,183 A | 8/2000 | Beene |
| 10,132,849 B1 | 11/2018 | Hall |
| 10,250,376 B2 | 4/2019 | Hooper et al. |
| 10,292,245 B2 | 5/2019 | Taipale et al. |
| 10,311,010 B2 | 6/2019 | Kessler et al. |
| 2011/0093739 A1 | 4/2011 | Bernon-Enjalbert et al. |
| 2018/0335461 A1* | 11/2018 | Hall ........................ G11C 5/147 |

FOREIGN PATENT DOCUMENTS

| | | |
|---|---|---|
| EP | 1860408 A1 | 11/2007 |
| EP | 3404841 A1 | 11/2018 |

OTHER PUBLICATIONS

Extended European search report issued in corresponding EP application No. 21150989.8, dated May 18, 2021.

* cited by examiner

*Primary Examiner* — Terrell S Johnson
(74) *Attorney, Agent, or Firm* — Locke Lord LLP; Daniel J. Fiorello; Gabrielle L. Gelozin

(57) ABSTRACT

A power and data communication system including an inboard computer system that includes a resistor network, an outboard computer system that includes at least one current limiter and voltage limiter that receives power from the inboard computer in order to power electronics of the outboard computer, and first and second wires connecting the resistor network of the at least one current limiter.

17 Claims, 3 Drawing Sheets

POWER AND SERIAL COMMUNICATION SCHEME

BACKGROUND

Technological Field

The present disclosure relates generally to signal communication, and in particular to a system and method for providing two-wire power communication.

Description of Related Art

Avionics systems typically utilize computers that are located within the fuselage of the airplane, eg E-bay. These computers interface with active sensors or remote data concentrators which can be located either internally or externally to the airplane fuselage. Two wire serial communications is typically used and additional wiring is required to power the active sensor or RDC, resulting in at least 4 wires. Aircraft power needs to be conditioned to correct for power bus variation. This typically requires a switched mode power supply to perform this conditioning. Multiple Wires over long spans add weight to the airplane. Since the active sensors/data concentrators can reside in a flammable environment, the electronics need to be intrinsically safe when exposed to EMIC, Lighting and Hot Short threats. These issues drive LRU cost, lower reliability and add weight to the airplane.

Although conventional methods and systems have generally been considered satisfactory for their intended purpose. There is still a need in the art for a signal communication having improved reliability and reduced complexity. There also remains a need in the art for such components and system that are economically viable. The present disclosure may provide a solution for at least one of these remaining challenges.

SUMMARY OF THE INVENTION

A method of communicating power and data between an inboard computer and an outboard computer includes driving, by the inboard computer, a power signal through an resistor network, receiving, by the outboard computer, the power signal by a pair of parallel current limiters, powering a processor of the outboard computer using the received power signal, and generating a serial control signal by the outboard computer in order to activate a switch responsible for pulling down a voltage feed, wherein pulling down is decreasing voltage across the circuit. The method can include powering a voltage regulator using a steering diode and forward biasing the steering diode. The method can include powering a hold up capacitor using the received power signal and monitoring by the in board computer a voltage drop across the resistor network.

A power and data communication system is disclosed for communicating power and data between an inboard computer and an outboard computer. The system includes an inboard computer system that includes a resistor network, an outboard computer system that includes at least one current limiter and voltage limiter that receives power from the inboard computer in order to power electronics of the outboard computer, and first and second wires connecting the resistor network of the at least one current limiter. The resistor network can include a four-resistor resistor network or a two resistor-resistor network.

Two resistors of the four-resistor network can be connected to a differential receiver amplifier of the inboard computer. One of the resistors of the resistor network can connected to an external power source. One of the resistor of the four-resistor network can be connected to ground. The at least one current limiter can include a pair of parallel current limiters, each connected to the first or the second wire. The outboard computer can include a load switch in-series with a load resistor, a processor configured to control a switch to selectively connect a load across the voltage limiter, and located within a fuselage of an aircraft. The system can also be located within a flammable environment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
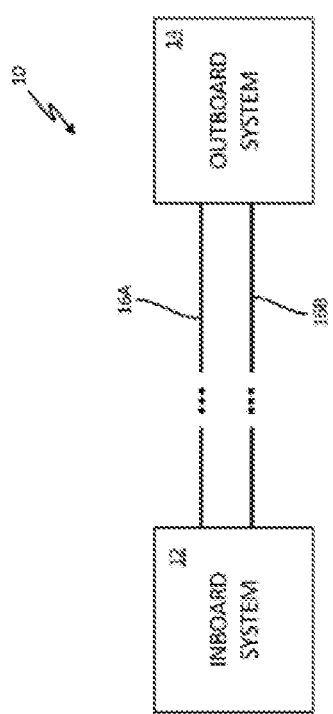
FIG. 1 is a block diagram illustrating a communication system that utilizes a two-wire power and serial communication scheme.

Reference will now be made to the drawings wherein like reference numerals identify similar structural features or aspects of the subject invention. For purposes of explanation and illustration, and not limitation, a partial view of an exemplary embodiment of a power signal communication system in accordance with the invention is shown in FIG. 1 and is designated generally by reference character 100. Other embodiments of the system in accordance with the disclosure, or aspects thereof, are provided in FIGS. 2 and 3 as will be described.

FIG. 1 is a block diagram illustrating communication system 10 that utilizes a two-wire power and serial communication scheme. System 10 includes inboard system 12, outboard system 14, and communication wires 16 *a* and 16 *b*. Inboard system 12 may be any system that communicates with, and provides power for, remote systems, such as aircraft computer systems internal to the fuselage, for example. Outboard system 14 is any computer system that receives power from inboard system 12 and provides data communication to inboard system 12. Outboard system may be a remote data concentrator (RDC) or active sensor, for example. Wires 16 *a* and 16 *b* may be any type of conductor capable of providing electrical power to outboard computer 14 and providing electrical data to inboard computer 12. Since only two wires are required for both power and serial communication resulting in lower wire weight.

Figure 2:
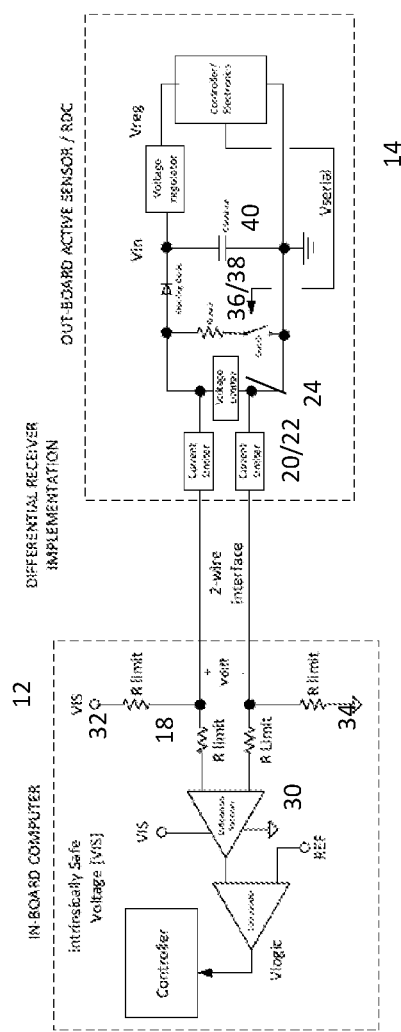
FIG. 2 is a circuit diagram illustrating a detailed view of FIG. 1, showing the system configured to utilize a two-wire power and serial communication scheme.
Figure 3:
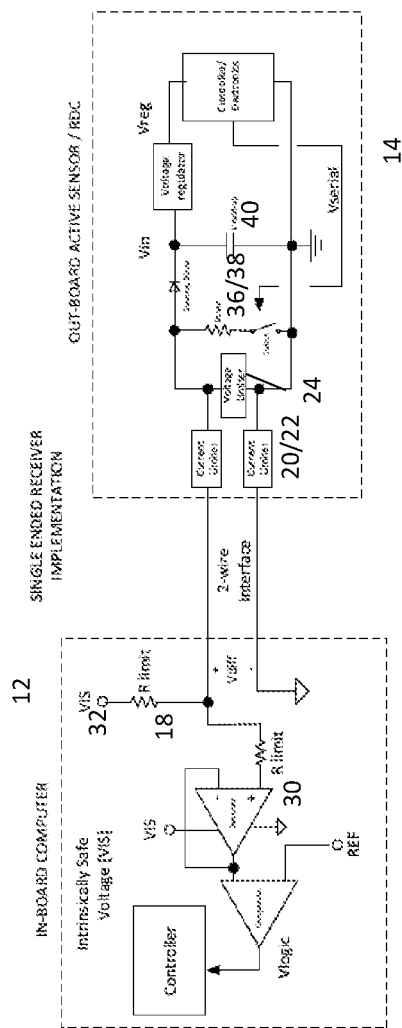
FIG. 3 is a circuit diagram illustrating a detailed view of FIG. 1, showing an alternative system configured to utilize a two-wire power and serial communication scheme

FIG. 2 shows a detailed view of the power and data communication system 10 for communicating power and data between the inboard computer 12 and the outboard computer 14. The inboard computer system 12 includes a resistor network 18. The outboard computer 14 includes a pair of current limiters 20/22 and a voltage limiter 24 that receives power from the inboard computer 12 in order to power electronics of the outboard computer 14, and first and second wires 16 connecting the resistor network 18 and the at least one current limiter 20/22. The resistor network 18 can include a four-resistor resistor network (as shown in FIG. 2) or a two resistor-resistor network (as shown in FIG. 3).

At least one of the resistors of the resistor network 18 can be connected to a differential receiver amplifier 30 of the inboard computer 12. One of the resistors of the resistor network 18 can connected to an external power source 32. One of the resistor of the resistor network 18 can be connected to ground 34.

The outboard computer 14 can include a load switch 36 in-series with a load resistor 38, a processor 40 configured to control the switch 36 to selectively connect a load across the voltage limiter, and located within a fuselage of an aircraft. A capacitor 40 is sized to limit the energy storage capacity preventing spark ignition in a flammable environment. The maximum voltage developed across the capacitor 40 is controlled by the voltage limiter. This feature is critical when EMIC, Lightning and Hot Short threats are present. To mitigate high conduction currents from occurring with these threats, current limiters 20/22 are located on each signal line. A plurality of voltage and current limiters may be used to ensure the design is fault tolerant from an intrinsic safety standpoint.

The method of communicating power and data between the inboard computer 12 and the outboard 14 computer includes driving, by the inboard computer 12, a power signal through the resistor network 18, receiving, by the outboard computer 14, the power signal by the pair of parallel current limiters 20/22, powering a processor of the outboard computer 14 using the received power signal, and generating a serial control signal by the outboard computer 14 in order to activate the switch 36 responsible for pulling down a voltage feed, wherein pulling down is decreasing voltage across the circuit.

The methods and systems of the present disclosure, as described above and shown in the drawings, provide for a power communication system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of communicating power and data between an inboard computer and an outboard computer, the method comprising:

driving, by the inboard computer, a power signal through an resistor network;
receiving, by the outboard computer, the power signal
powering a processor of the outboard computer using the received power signal; and
generating a serial control signal by the outboard computer in order to activate a switch responsible for pulling down a voltage feed, wherein the power signal is received by a pair of parallel current limiters.

2. The method of claim 1, wherein further comprising powering a voltage regulator using a steering diode.

3. The method of claim 2, further comprising forward biasing the steering diode.

4. The method of claim 1, further comprising powering a hold up capacitor using the received power signal.

5. The method of claim 1, further comprising monitoring by the in board computer a voltage drop across the resistor network.

6. The method of claim 1, wherein the voltage across the resistor network is kept below a spark producing condition in a flammable environment.

7. A power and data communication system comprising:
an inboard computer system that includes a resistor network;
an outboard computer system that includes voltage limiter that receives power from the inboard computer in order to power electronics of the outboard computer, wherein the outboard computer further includes at least one current limiter; and
first and second wires connecting the resistor network of the at least one current limiter.

8. The system of claim 7, wherein the resistor network includes a four-resistor resistor network.

9. The system of claim 7, wherein the resistor network includes a two-resistor resistor network.

10. The system of claim 8, wherein two resistors of the four-resistor network are connected to a differential receiver amplifier of the inboard computer.

11. The system of claim 7, wherein one of the resistors of the resistor network is connected to an external power source.

12. The system of claim 7, wherein one of the resistor of the resistor network is connected to ground.

13. The system of claim 7, wherein the at least one current limiter includes a pair of parallel current limiters, each connected to the first or the second wire.

14. The system of claim 7, wherein the outboard computer includes a load switch in-series with a load resistor.

15. The system of claim 7, wherein the outboard computer includes a processor configured to control a switch to selectively connect a load across the voltage limiter.

16. The system of claim 7, wherein the system is located within a fuselage of an aircraft.

17. The system of claim 7, wherein the system is located within a flammable environment.

* * * * *